May 14, 1963   O. G. LEWIS ETAL   3,089,474
PEAK SEEKING CONTROLLER
Filed Jan. 3, 1961

INVENTORS
OLIVER G. LEWIS
ALBERT F. PEARCE
BY
*E. M. Thomas* ATTORNEY

3,089,474
PEAK SEEKING CONTROLLER

Oliver G. Lewis, Westfield, and Albert F. Pearce, Franklin Park, N.J., assignors to Esso Research and Engineering Company, a corporation of Delaware
Filed Jan. 3, 1961, Ser. No. 80,472
6 Claims. (Cl. 123—119)

The present invention relates to a so-called "peak seeking controller," that is, a device which is effective for establishing automatically an optimum value of an independent variable in a system, such as a mechanical apparatus, where a secondary variable is dependent upon the independent variable. In other words, the invention is adapted to establish an optimum value of an independent variable when its dependent function is to be established within some known desirable range.

There are numerous mechanisms, from those of simple type to those which are highly complex, such as are involved in controlling conversion processes in industry, where it is highly desirable to establish automatically a control of a factor or function which, in turn, will produce desired values of other functions or operations. As a specific example, the invention is particularly suitable for controlling the fuel feed rate to an internal combustion engine which is being operated over extensive periods of time as in prolonged test work and the like. It will be clearly understood, however, that the invention is equally applicable to other types of apparatus and to processes involving apparatus for control of conditions such as feed rates of raw materials, temperatures, circulation velocities, catalytic conditions, and numerous other factors.

In a relatively simple embodiment which is illustrated in detail, an independent variable such as the rate of fuel feed to an automotive engine, is placed under the control of a reversible motor means. This motor means is so designed that the independent variable, such as the fuel feed rate, can be increased above or reduced below its optimum. As this factor is being varied, electric current means varying in the same manner (or if desired, in inverse relation thereto) is fed to an amplifier, and the signal so amplified is used along with other signals to regulate the setting of the fuel feed.

Meanwhile a dependent variable, such as engine operating temperature for example, is also caused to impart a signal such as an electric current, which is amplified to operate an accurate follower or slave type motor, such as a "Selsyn" motor of well known type which, in turn, can move a control device in either direction, depending upon the current value. In the course of such motion, one of two alternative electric circuits is activated to permit a current to flow. This current, in combination with that from the first-mentioned amplifier, is taken to additional control means where it is matched up against an electrical impedance which balances that associated with the first signal producing element. The balance or imbalance of these currents is utilized to increase or reduce the setting of the independent variable, i.e. in this case fuel feed control, so as to establish its optimum value for the desired temperature range.

For example, where it is known that optimum fuel feeding rate will produce maximum temperature for a given operating condition or for a given rate of fuel consumption, the apparatus can be utilized to establish the optimum fuel setting such as the fuel-to-air ratio productive of the maximum power for given fuel consumption.

The invention will be more fully understood by reference to the attached drawing wherein.

Figure 1:
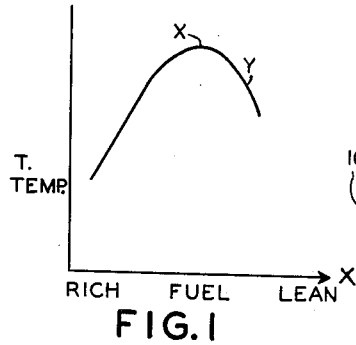
FIG. 1 shows graphically the optimum value of an independent variable X with respect to its dependent function T.

Referring now to FIG. 1, if we assume that increasing the fuel feed ratio F along the X axis causes an increase in operating temperature to a maximum denoted by $x$ at the top of the curve, further increase in setting (which may correspond to a leaner fuel mixture) causes a drop in operating temperature, for example, to point $y$. Obviously for maximum efficiency it is desired to operate the engine substantially at point $x$. However, in operating techniques where other factors such as engine speed, fuel quality, ambient temperature and other factors may be varied, the richness or leanness of the fuel mixture may require periodic adjustment. Automatic means are needed for bringing the variable back to its maximum if it drifts away therefrom. The apparatus of FIG. 2 is adapted to accomplish this.

Figure 2:
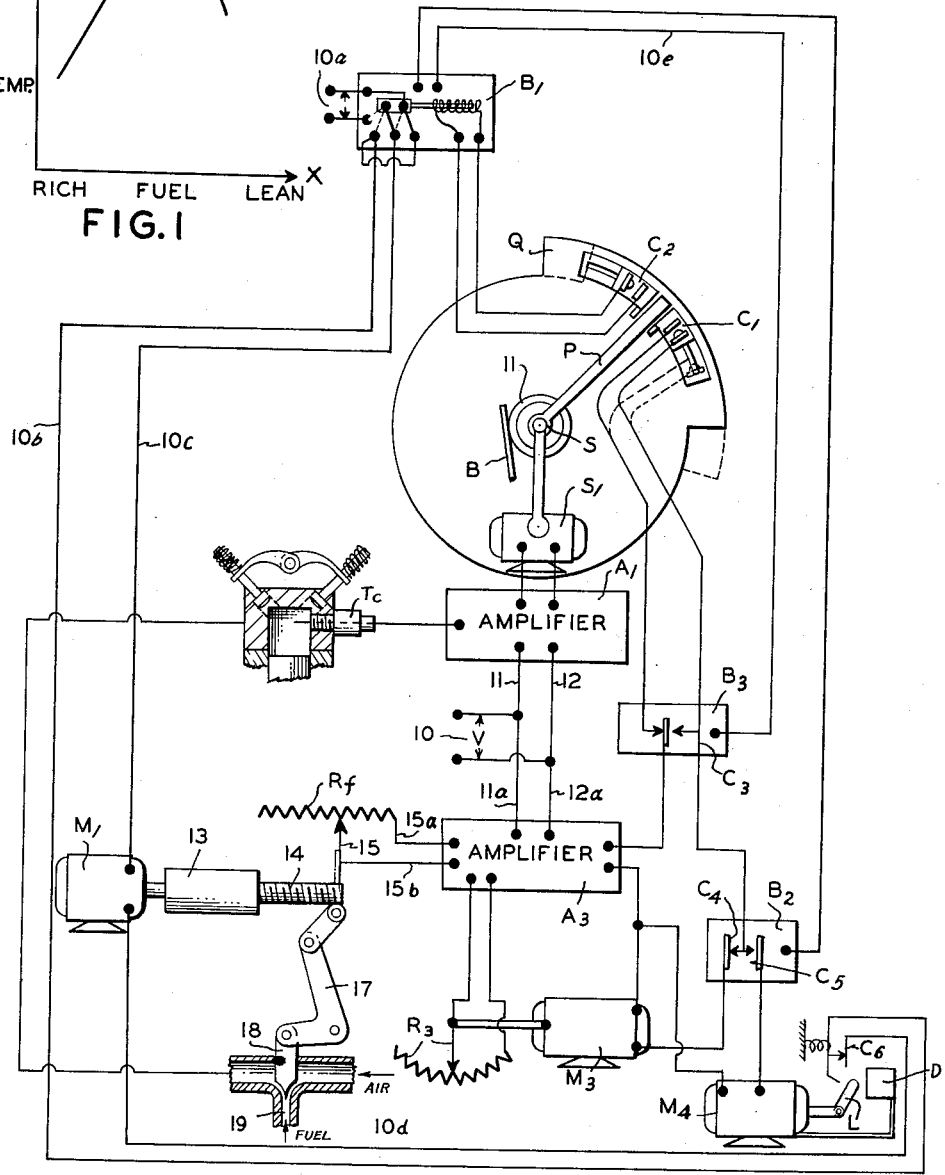
FIG. 2 shows diagrammatically a system of the present invention as applied to the practical establishment of an optimum fuel feed ratio in an engine.

In FIG. 2 an applied voltage from a suitable power source, such as ordinary 110 volt mains, is indicated at 10 and 10a. This is supplied to an amplifier $A_1$ through lines 11 and 12, and to another amplifier $A_3$ through lines 11a and 12a.

A reversible electric motor $M_1$, driven from a power source to be explained below, is connected mechanically with a screw operated potentiometer, the driving mechanism 13 serving to propel the screw 14 to the right or the left, depending on the direction of the motor drive. The potentiometer includes the variable resistance $Rf$ which connects through lead 15a to amplifier $A_3$. The movable contact 15 is connected through line 15b to said amplifier. Movement of the screw 14 also operates a lever 17 which, in turn, controls a valve element 18 in a restricted orifice 19 through which the fuel mixture may pass. Alternatively this mechanism may be used to control the amount of fuel fed to a fuel injector on each stroke, thereby varying the richness of the fuel fed to the engine under test.

Assuming for the moment that movement of the pointer 15 to the right represents an increasingly lean fuel mixture, it will be evident that a point will be reached in the curve of FIG. 1 which represents maximum power for the engine under test. Ordinarily, maximum power will be released when maximum combustion temperature is being obtained, and this maximum temperature will be sensed by the thermocouple TC appropriately fitted into the engine combustion zone. This thermocouple generates a voltage in the general range of a few millivolts, which varies with the temperature and which, when fed to amplifier $A_1$, may be amplified to operate the motor $S_1$.

The motor $S_1$ is mechanically connected to a movable pointer P mounted on a shaft S which also supports an independently movable quadrant Q. Quadrant Q is fitted with two contact points $C_1$ and $C_2$, and is held against inadvertent movement by a light brake B fitted against the hub H, on which the quadrant is mounted for rotary movement. In practice the brake B can be the contact arms of a commutator system carrying the leads $C_1$ and $C_2$ from the hub of quadrant Q. Obviously when the pointer P is moved clockwise it will close contact $C_1$, and upon further movement will propel the quadrant Q in the direction of motion. Likewise on counter-clockwise movement, the pointer P will move away from contact $C_1$ permitting it to open and if it moves far enough, will close contact $C_2$. Light springs normally hold the contacts open. Further movement in counter-clockwise direction, as seen in FIG. 2, will propel the quadrant Q in the counter-clockwise direction against the light restraining force of brake B.

The quadrant Q is counterbalanced and arranged to move under light pressure from the pointer P, but otherwise it remains in a set position. As the temperature sensed by thermocouple TC increases, it causes pointer P to move toward contact $C_1$ which it closes and maintains closed as long as the temperature continues to increase. The quadrant Q can move as far as necessary to follow the maximum temperature. As soon as the combustion chamber temperature T begins to fall, however, the pointer P begins to move counter-clockwise. On this movement contact $C_1$ is opened and the quadrant Q remains in position as long as the pointer P does not nudge either contact $C_1$ or $C_2$.

Assuming that motor $M_1$ is still running to vary the fuel feed further from rich to lean, an electrical imbalance results. This is for the reaosn that an electrical signal varied by $Rf$ and proportional to the fuel feed rate, is being supplied to servo-amplifier $A_3$. The output of amplifier $A_3$ is fed through closed contact $C_1$ and through relays $B_3$ and $B_2$ to a servomotor $M_3$. The latter is connected with a variable resistance or potentiometer $R_3$. $R_3$ is then driven to exactly balance $Rf$ and thus become directly proportional to the fuel feed rate. Upon decrease of temperature T ever so slightly however, servomotor $S_1$ reverses its direction causing the pointer P to open contact $C_1$, leaving $R_3$ proportional to the fuel feed rate required to give peak combustion chamber temperature. The amplifiers $A_1$ and $A_3$ are designed to keep the respective resistance circuits in balance.

Now as combustion chamber temperature continues to drop further (the temperature deviation being determined by the span between contacts $C_1$ and $C_2$), pointer P ultimately will close contact $C_2$. The latter energizes a relay box $B_1$ which derives its power from the voltage mains 10a. This reverses the fuel feed control motor $M_1$ through lines 10b, 10c and 10d. Motor $M_1$ then begins to move the potentiometer 15 in the opposite direction and also to increase the fuel feed through the leverage 17, 18. Referring to FIG. 1, the point on the curve now begins to move from y back to peak point x. At the same time the control box $B_1$ also energizes control box $B_3$ through a lead 10e, thus short-circuiting the contact $C_1$ by closing contacts $C_3$ at box $B_3$. At the same time the control box $B_1$ also energizes control box $B_2$, thus transferring the servomotor leads from motor $M_3$ to another Selsyn motor $M_4$. This is done by opening contacts $C_4$ and simultaneously closing contacts $C_5$.

The output shaft of servomotor $M_4$ has an arm L affixed to it with a very limited travel. The motor is stalled by the arm striking a stop D in clockwise direction, and by stopping against a contact member $C_6$ which is opened when the motor $M_4$ attempts to move arm L counter-clockwise. Hence as the amplifier $A_3$ becomes unbalanced in one direction, the arm L will be stalled against stop D; whereas unbalance in the other direction opens contacts $C_6$.

Since the fuel feed control motor $M_1$ in the operation first described has driven the potentiometer $Rf$ past the peak point x on the temperature curve, FIG. 1, $Rf$ has become greater than $R_3$ which was left proportional to the fuel feed rate X. This unbalances amplifier $A_3$ and causes it to drive motor $M_4$ to bring arm L against stop D. This allows motor $M_1$ to be reversed by control relay $B_1$. Now, as the fuel feed and $Rf$ approach point x on the curve from the right, the unbalance becomes less and less, so that at point x, $Rf$ exactly balances $R_3$ and amplifier $A_3$ becomes balanced. The engine being tested will continue to operate under these conditions until some further factor requires a change. In this position, i.e. when the amplifier has the reference voltage $R_3$ and $Rf$ in balance, the arm L moves away from stop D just enough to open the contact $C_6$ and stop motor $M_1$ and further change in the fuel feed at the previously determined optimum temperature point.

By means of an automatic timing cycle, or manually if desired, the operation may be repeated at suitable intervals to keep the engine operating at the peak conditions.

While the operation has been described as controlling a fuel mixture to achieve a desired optimum temperature, it is obvious that any other independent parameter may be adjusted to a point where the dependent variable reaches a peak or an optimum point. If desired, the optimum may be a minimum rather than a maximum, or it may represent some other predetermined characteristic on a curve.

The invention has been used successfully to set the fuel-air mixture fed to an engine to obtain maximum power. In this case, as claimed above, combustion chamber temperature is the dependent variable employed to establish the setting.

The system has also been used to set a fuel-air mixture at the proper setting for maximum detonation intensity in the knock-rating of automotive fuels. In this case the dependent variable is the output of a sensitive motor circuit which reads intensity of knock vibrations. Signals from this source replace the temperature signals from the thermocouple TC in the drawing of FIG. 2.

The system also has been used for obtaining the optimum spark timing setting for internal combustion engines and obviously has many other applications in industrial equipment. It can be used for controlling industrial processes wherein such interrelated variables as temperature and throughput, catalyst feed rate and product selectivity, etc. may be involved.

The system has also been used in conjunction with an electronic torque indicating mechanism. In this case, it was applied to an internal combustion engine to set directly to maximum the spark advance and the maximum fuel-air mixture as a direct function of torque. Other applications will be self-evident to those skilled in the art.

What is claimed is:

1. A control mechanism for machinery which comprises in combination, a stabilizing means for an operating machine comprising means for sensing changes in at least one element of power input into said machine, another means for sensing a secondary effect of such power input and following it until said secondary effect reaches a desired optimum value, and another means for altering the rate of change in said element when said second sensing means senses said desired optimum value.

2. A peak seeking device for stabilizing an operating machine substantially at an optimum value of an independent operating condition, which comprises, in combination, motor driven means for varying said operating condition in either direction from its optimum value, means for sensing a secondary effect of such variation as said operating condition is varied in one direction, means controlled by said sensing means for continuing the operation of the motor driven means in the same direction until a first predetermined limit is reached by said varying means, and means operable upon reaching said predetermined limit for reversing the motor driven means to return to a second predetermined limit, said continuing means and said reversing means being arranged to operate alternately as required to stabilize said independent operating condition between said limits.

3. In combination, a reversible electric motor adapted to move a control element and thereby to vary in either direction an independent operating variable of a dynamic system, a variable impedance to electric current, mechanical means adapted to change the value of said impedance as said independent variable is changed, means for applying an electrical voltage to said variable impedance, amplifying means for sensing and amplifying the current variations caused by said varying impedance, a primary control device, another motor means operated by output of said amplifying means for moving said primary control device towards a predetermined limit, a reversing switch for said electric motor, and means actuated by the primary control device for operating said reversing switch when the independent operating variable reaches a predetermined value.

4. In apparatus for controlling an independent variable such as relative rate of fuel to air feed to a fuel consuming engine and the like, so as to obtain optimum combustion as measured by a temperature range as a dependent variable, the combination which comprises means for producing an electrical signal indicative of said dependent variable, means for amplifying said signal, means for changing said independent variable including electric motor means, means for producing a signal indicative of said independent variable, means for amplifying said signal, and means for utilizing both said signals to establish through said motor means an optimum value of said dependent variable.

5. In combination, reversible motor driven means for varying the fuel feed to an engine, temperature responsive means for detecting temperature changes in said engine and producing signals indicative of such temperatures, means for amplifying said signals, motor means adapted to be operated by said signals to move a reversible control device whereby to reverse, as required, the motor driven means and thereby to establish an optimum fuel feed corresponding to a desired optimum operating temperature.

6. A control instrument for an internal combustion engine which comprises, in combination, a reversible electric motor adapted to vary the fuel mixture richness in either direction, an electrical impedance element also operable by said reversible motor so as to permit flow of a first electric current whose magnitude is proportional to the fuel richness, a temperature sensing device adapted to produce a signal current, an amplifier for strengthening said signal current, a Selsyn motor adapted to be driven in either direction under control of said signal current and dependent upon its magnitude, a first control drive equipped with two pairs of electrical contacts and adapted selectively to close one or the other of such pairs in response to operation of said Selsyn motor in one direction or the other, first relay means under control of one of said pairs of contacts for supplying current to a second control device, a second amplifier for said first electric current, an impedance matching device under control of said second amplifier in combination with said first control means, and second control means activated by said first control means and said second amplifier for controlling said reversible electric motor.

References Cited in the file of this patent

UNITED STATES PATENTS

| | | |
|---|---|---|
| 2,013,998 | Goldsborough | Sept. 10, 1935 |
| 2,040,778 | Morgan | May 12, 1936 |
| 2,248,090 | Kittler | July 8, 1941 |
| 2,355,090 | Love et al. | Aug. 8, 1944 |
| 2,389,797 | MacNeil et al. | Nov. 27, 1945 |
| 2,595,524 | Henneman et al. | May 6, 1952 |